United States Patent [19]

Loomans et al.

[11] Patent Number: 4,945,807
[45] Date of Patent: Aug. 7, 1990

[54] METHOD AND APPARATUS FOR PROCESSING POTENTIALLY EXPLOSIVE AND SENSITIVE MATERIALS FOR FORMING LONGITUDINALLY PERFORATED EXTRUDATE STRANDS

[75] Inventors: Bernard A. Loomans; James E. Kowalczyk, both of Saginaw; Jerry W. Jones, Bay City, all of Mich.

[73] Assignee: APV Chemical Machinery, Inc., Saginaw, Mich.

[21] Appl. No.: 237,415

[22] Filed: Aug. 29, 1988

[51] Int. Cl.⁵ .................. C06B 21/00; B28C 7/16; B29C 47/06
[52] U.S. Cl. ...................... 86/1.1; 86/20.1; 264/3.3; 264/148; 366/77; 425/131.1; 425/290; 425/309; 425/380; 425/192 R; 425/DIG. 15; 425/DIG. 243; 425/DIG. 244
[58] Field of Search ............ 264/3.3, 148; 366/77, 366/85, 88, 301; 86/1.1, 20.1; 425/131.1, 290, 309, 192 R, 380, DIG. 15, DIG. 243, DIG. 244

[56] References Cited

U.S. PATENT DOCUMENTS

| | | | |
|---|---|---|---|
| 2,491,588 | 12/1949 | Shively, Sr. | 264/3.3 |
| 2,944,287 | 7/1960 | Moran | 264/3.3 |
| 3,381,336 | 5/1968 | Wells | 425/192 R |
| 3,416,190 | 12/1968 | Mehnert | 425/192 R |
| 3,561,053 | 2/1971 | Pearson | 425/192 R |
| 3,574,889 | 4/1971 | Hire et al. | 425/192 R |
| 3,618,162 | 11/1971 | Scharer et al. | 425/67 |
| 3,884,452 | 5/1975 | Britten et al. | 366/85 |
| 3,928,514 | 12/1975 | Brachert et al. | 264/3.3 |
| 3,960,993 | 6/1976 | Johnson et al. | 264/3.3 |
| 4,032,279 | 6/1977 | Kim | 264/209 |
| 4,051,207 | 9/1977 | Brachert et al. | 149/96 |
| 4,076,477 | 2/1978 | Hacke | 425/464 |
| 4,112,516 | 9/1978 | Hotz | 366/80 |
| 4,120,920 | 10/1978 | Cougoul et al. | 149/96 |
| 4,445,833 | 5/1984 | Moriki et al. | 425/131.5 |
| 4,541,982 | 9/1985 | Upmeier | 264/349 |
| 4,585,600 | 4/1986 | Rollyson et al. | 264/3.3 |
| 4,744,669 | 5/1988 | Kowalczyk et al. | 366/77 |
| 4,767,577 | 8/1988 | Muller et al. | 264/3.3 |

Primary Examiner—Howard J. Locker
Attorney, Agent, or Firm—Learman & McCulloch

[57] ABSTRACT

A manifolded, multiple-pin die apparatus and method processes potentially explosive material to form longitudinally perforated cylindrical pellets for use as gun propellants. A main entrance passage formed in mating manifold blocks gradually changes in cross-sectional configuration from circular to figure-eight, and then branches in a gently curved manner. The divergent branches formed then further branch in the same manner and feed circular cross-section passages leading to extruding dies wherein a series of die pins extend axially through a discharge passage. Each die comprises a central core member supporting an outer shell via radial ribs which are configured to form flow passages of hour-glass configuration. No change of flow direction in the entire apparatus exceeds fifteen degrees.

21 Claims, 5 Drawing Sheets

METHOD AND APPARATUS FOR PROCESSING POTENTIALLY EXPLOSIVE AND SENSITIVE MATERIALS FOR FORMING LONGITUDINALLY PERFORATED EXTRUDATE STRANDS

BACKGROUND OF THE INVENTION

This invention relates to the extrusion of materials which are sensitive to dehomogenization and degradation, and more specifically explosive materials that are extruded in the form of longitudinally perforated strands which are cut into pellet-size lengths Typical materials encountered in the art with which this invention is concerned comprise highly viscous substances with entrained particulate solids. The material is discharged from either a continuous or batch mixer as a highly viscous fluid with entrained particulate solids of explosive materials, such as nitramines, encased in a synthetic plastic binder. A typical binding plastic is cellulose acetate butyrate with a solvent, which solidifies with solvent vaporization on being extruded from the multiple pin dies which are employed.

Continuous mixer-extruders of the type disclosed in U.S. Pat. No. 4,744,669, can be utilized to mix and extrude such energetic material. The machine disclosed in that patent is a twin screw, co-rotating, self-wiping, fully intermeshing, continuous mixer with in-line extrusion capability. Typical energetic materials may be identified as single-base propellants (nitro-cellulose), double-base propellants (nitro-cellulose plus nitro-glycerin or other liquid explosive), and triple-base propellants (nitro-cellulose plus nitro-glycerin plus nitroguanidine). An alternate method of producing gun propellants is the batch processing system wherein the product of sigma blade mixing is fed to a ram extruder which supplies the mixed material directly to the dies. Prior art extruding systems have not provided the homogeniety desired and have been characterized by a considerable pressure drop in the dies which facilitated the formation of secondary flow currents and dead spots.

SUMMARY OF THE INVENTION

The present invention contemplates the provision of a manifold and multi-pin die extrusion system in which the shear stress in the fluid is more uniform throughout the flow path, and the migration of solid explosive particles in the fluid binder is minimized so that such particles do not tend to rub together with the potential of causing an explosion.

One of the prime objects of the present invention is to provide a system and method of producing longitudinally perforated strands from a viscous or doughy extrudate mass which can be split into separate uniform streams and fed to a plurality of dies which are designed to promote flow of the material through the dies at a more uniform shear rate with reduced pressure drop.

Still another object of the invention is to design a manifold-die system wherein dead spots and countercurrent flows are eliminated.

Still another object of the invention is to provide a system of the character described wherein disruptions of the flow, and abrupt changes in its direction, are avoided, and the shear stress in the material proceeding through the system is more constant.

Still another object of the invention is to provide a system which more safely processes the material and reduces the pressure drops through the dies by as much as 50%, while producing an improved quality extrudate.

Still a further object of the invention is to provide a system of this type which can be more readily manufactured and temperature controlled.

Still another object of the invention is to provide a multiple-pin die assembly which facilitates interchanging of the die parts without the necessity of replacing the entire die.

A further object of the invention is to provide a manifold and multi-pin, multiple die system wherein processed material from the single discharge port of a continuous mixer is provided to, and processed through, each die at a constant velocity so that the strands extruded can be cut to uniform accurate lengths.

Still another object of the invention is to provide a system wherein the perforation pin geometry of the dies can be varied, without interchanging the entire dies.

Other objects and advantages of the invention will be pointed out specifically, or will become apparent from the following description, when it is considered in conjunction with the appended claims and the accompanying drawings.

Figure 1:
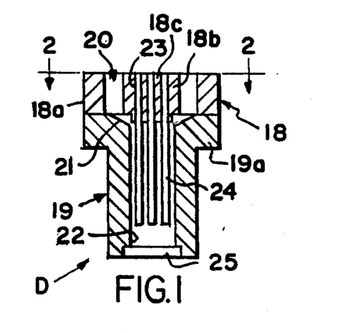
FIG. 1 is a sectional, elevational view illustrating a prior art die.
Figure 2:
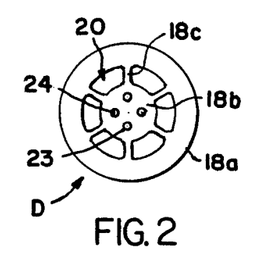
FIG. 2 is a top plan view thereof, taken on the line 2—2 of FIG. 1.
Figures 3, 4, 4A:
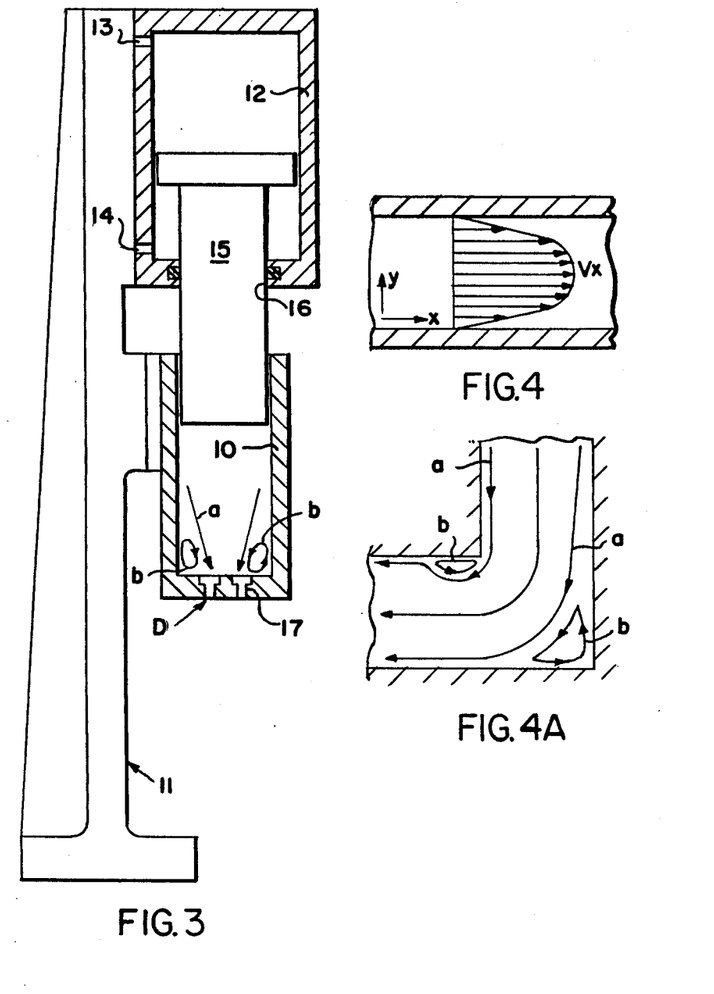
FIG. 3 is a schematic, sectional, elevational view illustrating a prior art ram extruder of the type used in a batch process for extruding energetic material through dies of the structure disclosed in FIGS. 1 and 2.
FIG. 4 is a schematic diagram illustrating the parabolic velocity distribution incident to laminar flow of a viscous fluid through a passage.
FIG. 4A is a view illustrating the secondary flows which are created when an abrupt change of direction occurs in a flow passage.

A typical prior art die structure is disclosed in FIGS. 1 and 2. FIG. 3 is a schematic view of a typical ram extruder which is employed to receive mixed material from a conventional sigma mixer and supply it to several such dies. It incorporates a cylinder 10, fixedly supported by a frame, generally designated 11, which also fixedly mounts a hydraulic cylinder 12 directly above, and in axial alignment with, the cylinder 10. Oil inlet and outlet openings 13 and 14 are provided in the cylinder 12 which mounts the usual displaceable ram piston 15, piston 15 extending through a sealed opening 16 in the lower end of closed cylinder 12 down into the open sealed upper end of cylinder 10. Provided in the lower wall of cylinder 10 are counterbored openings 17 which receive the dies, generally designated D, which are disclosed more particularly in FIGS. 1 and 2.

The prior art die units are shown as each made up of an upper, mass-receiving spider ring, generally designated 18, and a lower discharge member 19. Ring 18 includes an outer wall 18a connected to an inner cylindrical core 18b by integral ribs 18c which are circumferentially spaced apart to define inlet openings generally designated 20 between them. Discharge member 19 is shouldered as at 19a to fit one of the counterbored openings 17, and has a shallowly convergent, frustoconical transition inlet 21 leading to a cylindrical discharge passage 22. Provided within the core 18b are a series of openings 23 within which elongate pins 24 are fixed, the pins 24 extending downwardly toward the exit orifice 25 in discharge member 19.

When the ram piston 15 is raised up out of cylinder 10, a supply of mixed material can be dropped into the cylinder 10. Lowering of the ram 15, under the hydraulic pressure exerted by supplying hydraulic fluid through opening 13, while egressing it through opening 14, causes the product to be extruded through each die D in the form of a cylinder which has longitudinal perforations created by the axially parallel pins 24.

At least two principal disadvantages of a serious nature are experienced with the structure described. The first of these is a considerable dehomogenization, or unmixing, of the product in cylinder 10 and the dies D, and the second is the excessive pressure drop which occurs, particularly when the material passes through the dies D. As FIG. 4 illustrates, a viscous newtonian fluid flowing between parallel surfaces has a parabolic fluid velocity distribution, because the fluid tends to adhere to the walls of the passage. The velocity of flow at the walls is zero and reaches a maximum at the center or axis of the passage, as indicated. The rate of change of the velocity in the y direction is defined as the shear rate, which varies between a maximum at the passage wall to zero at the center of flow, and an excessive shear rate for the viscosity involved creates undue shear stresses. We have noted that solid explosive particles mixed with a viscous binder fluid tend to migrate toward the lower shear stress zones, if certain shear differentials are exceeded. This phenomenon is also affected by the temperature of the fluid, which affects viscosity as well as the shear rate.

FIG. 3 indicates what happens when abrupt changes are made in the cross-section of a flow channel. Here the continuity of flow in the direction a is disrupted by recirculating secondary flows b. Sharp discontinuities in shear rate take place and the probability of dehomogenization is very high. A similar condition occurs when there is an abrupt change in the direction of flow as indicated in FIG. 4A where, again, the direction of flow is indicated at a and the secondary flows are indicated at b. This is what occurs when the mass is forced against the upper surfaces of the ring 18 in FIG. 1 and is forced to turn 90 degrees. In the secondary flow zones the product, slowly recirculating under pressure, becomes unmixed in the sense that fluid is gradually expelled from the mass, which turns into a semi-solid and stagnates. In explosives production, serious hazards are created by the degradation which can occur in such a stagnated pocket. It is noted that the passage 21 in FIG. 1 also creates an abrupt flow direction change which creates a greater shear stress at this location as well as contributing significantly to pressure drop in the material proceeding through the die.

In FIGS. 5–8 we've disclosed a manifold and die assembly of the type which may be used with a continuous extrusion system of the type disclosed in the present assignee's afore-mentioned U.S. Patent. As will be seen, the change in direction in flow is maintained at a value of substantially 15° or less off the axis of flow leading to it throughout the system.

Figure 11:
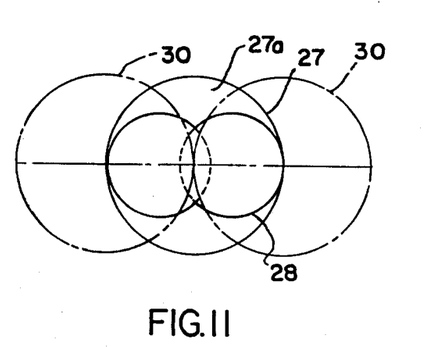
FIG. 11 is a schematic, top plan diagram illustrating the progressive configuration of the passages in the manifold at a location where the flow of material is branched.
Figure 12:
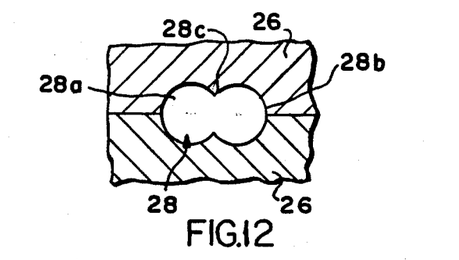
FIG. 12 is a fragmentary, sectional, plan view taken on the line 12—12 of FIG. 6.
Figure 13:
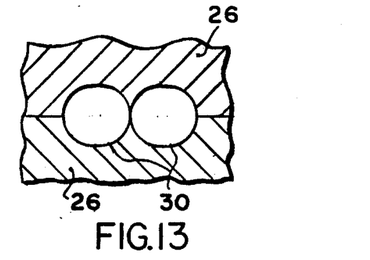
FIG. 13 is a similar view taken on the line 13—13 of FIG. 6.

The manifold assembly, identified generally at M, includes identical mating halves 26, each of which is provided with an entrance opening of semi-circular cross-section 27 which gradually merges into, a semi-figure-eight-shaped-in cross-section passage 28. The inlet opening IO formed by mating openings 27 in the halves 26 and the merging passage, which tapers when viewed endwisely (FIG. 5) at an angle x of fifteen degrees or less, receives the material from the exit orifice of the continuous mixer disclosed in the aforementioned U.S. Pat. No. 4,744,669, which is incorporated herein by reference. From the circular entrance formed by openings 27, the composite passage IO is of generally figure-eight section to the level 29 where it is of the constant configuration disclosed in FIG. 12 until the passage begins to diverge. The two overlapped, semicircular openings 28a and 28b provided in each manifold half 26 define a passage of figure eight configuration with saddles 28c which, from about the FIG. 12 level, gradually neck into extinction at the location 29a (FIG. 13) where a pair of passages of elliptical cross-section 30 (see FIG. 13), formed as adjacent bores of semi-elliptical section in each half 26, curve away at an angle c approximating 15°. From the FIG. 12 level to the FIG. 13 level the passage 28 gradually changes or merges to the FIG. 13 configuration as demonstrated in FIG. 11.

Figure 14:
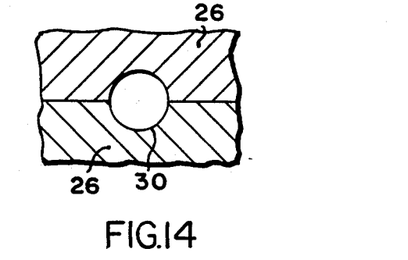
FIG. 14 is a similar view taken on the line 14—14 of FIG. 6.
Figure 15:
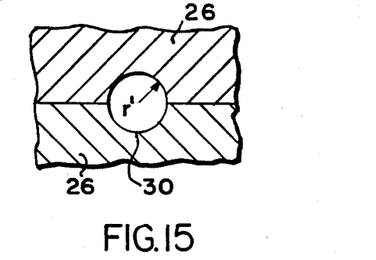
FIG. 15 is a similar view taken on the line 15—15 of FIG. 6.
Figure 16:
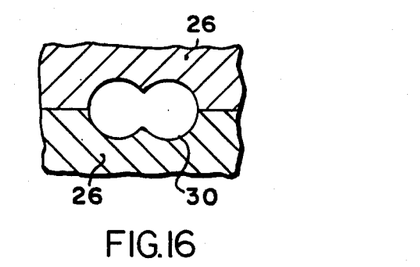
FIG. 16 is a similar view taken on the line 16—16 of FIG. 6.
Figure 17:
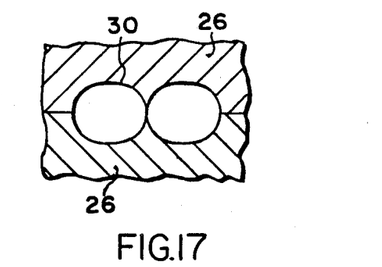
FIG. 17 is a similar view taken on the line 17—17 of FIG. 6.
Figure 18:
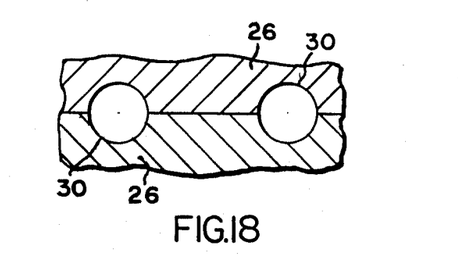
FIG. 18 is a similar view taken on the line 18—18 of FIG. 6.

At 30a, each passage 30, which, as FIG. 14 indicates, is circular in section at right angles to its axis, recurves at substantially the same angle c about a radius r taken from a point 31 on a diametral line 32 at a location where the circular passages 30 are vertical again and begin to merge to passages of diverging figure-eight cross-section 30b (FIG. 16) to provide a diverging transition to further branching. Radius r is maintained at a value greater than 8 times the radius r' of annular passages 30 (FIG. 15). At level 32, each passage 30 begins to diverge and gradually change its configuration to the figure-eight cross-section disclosed in FIG. 16. This cross-sectional area is at a maximum immediately upstream of the line 34 where the cross-sectional configuration is as demonstrated in FIG. 17 and the material flow diverges to passages 35 of circular cross-section at right angles to their axes of extent. Each passage 35 is comprised of semi-circular recesses in the halves 26 of the same size as the recesses forming passages 30. The transition from each annular passage 30 to the pairs of passages 35 is accomplished in the same manner as the initial transition to passages 30, via mergent surfaces 30c leading to saddles 35c at the same angle x. The saddle portions 35c gradually neck in, as previously, as the passage of figure-eight section grows in width in FIG. 6, while remaining unchanged in depth (FIG. 5), and then merges to passages 35 in the same manner. At the level 34, passages 30b branch at the same angle c of approximately 15° to form the branches 35 which then recurve at their lower ends as at 35a to join to diverging die entrance passages 36 of gradually increasing circular cross-section. The passages 36 communicate with the die accommodating bores 37 of circular cross-section provided in the lower end of the manifold formed by manifold sections 26. The passages 35 and 36 are similarly formed by semi-circular section recesses 35a and 36a provided in each manifold half 26 and the openings 37 are formed by semi-circular section recesses 37a provided in each mating manifold half 26. No change of direction greater than 15 degrees occurs in the flow passages provided by the mating halves 26. The manifold halves 26 are provided with mating heat transfer passages 26a which provide a network of distributive channels for a recirculating heat transfer fluid. Plugs 26b may be appropriately provided in various locations.

Figure 5:
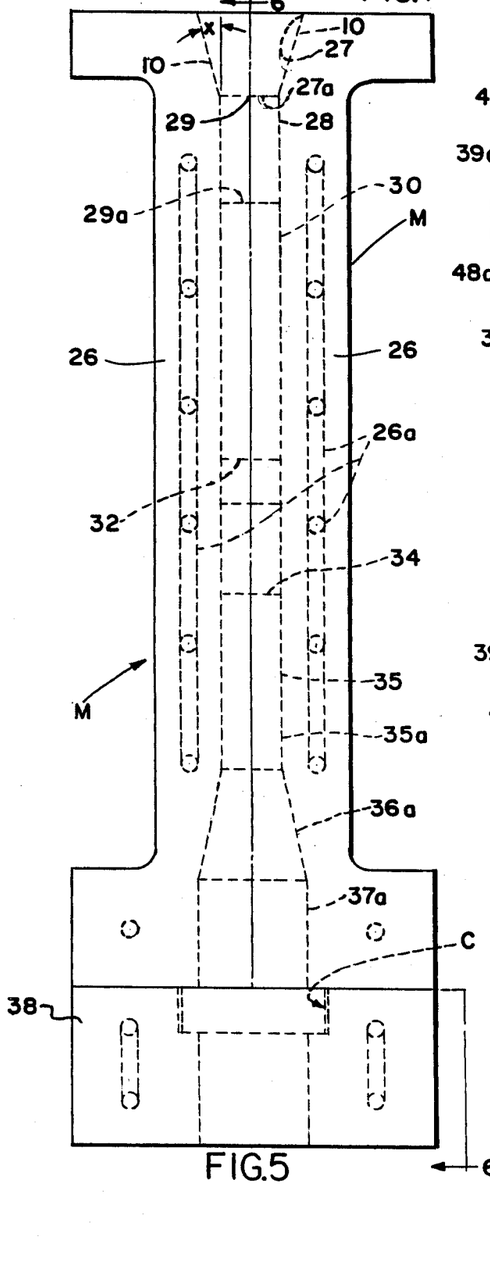
FIG. 5 is an end elevational view illustrating a die manifold with incorporated multi-pin dies.
Figure 6:
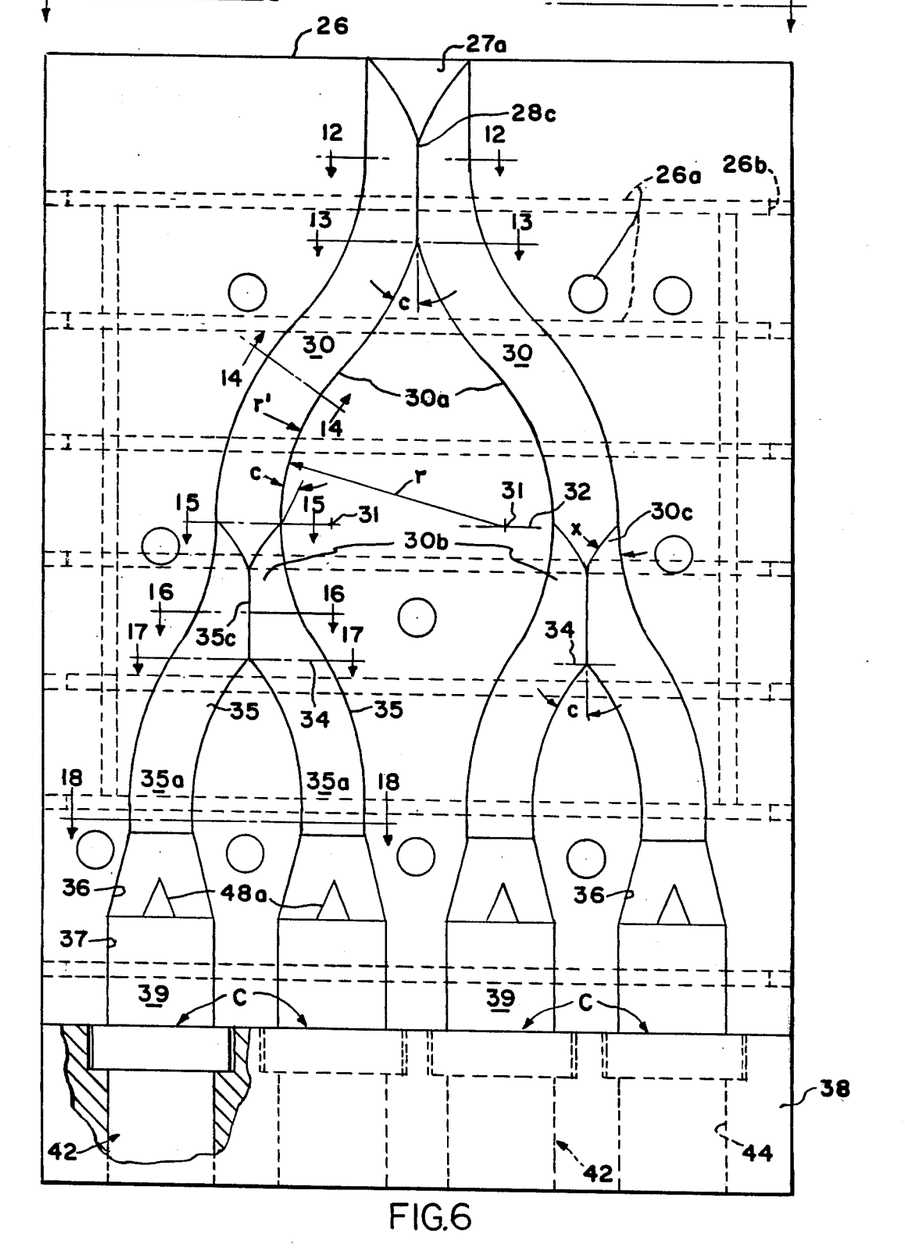
FIG. 6 is an elevational view taken on the line 6—6 of FIG. 5 to illustrate the interior face of one of the manifold halves.
Figure 7:
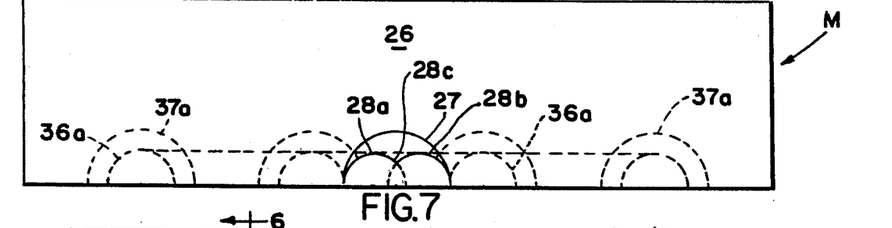
FIG. 7 is a top plan view taken on the line 7—7 of FIG. 6.
Figure 8:
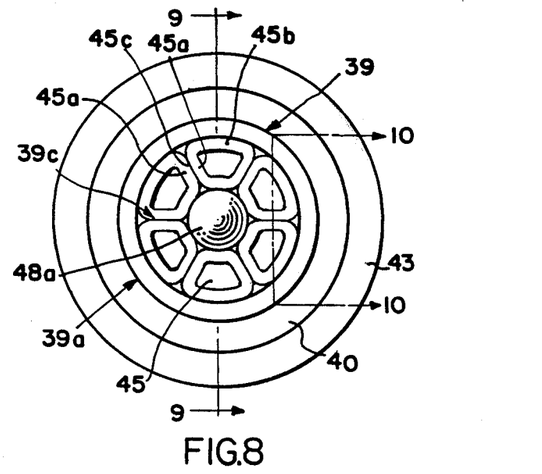
FIG. 8 is a top plan view of one of the multiple-pin die units incorporated in this system.
Figure 8A:
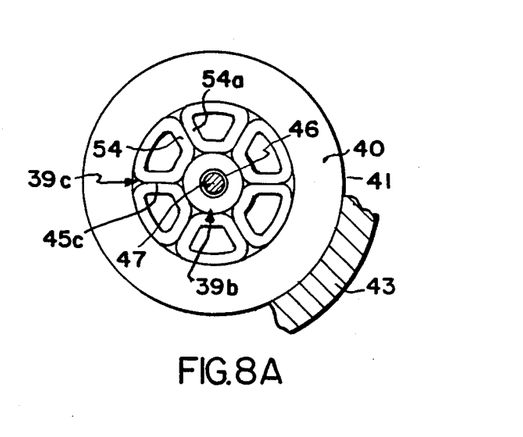
FIG. 8A is an inverse sectional plan view taken on the line 8A—8A of FIG. 9.
Figure 9:
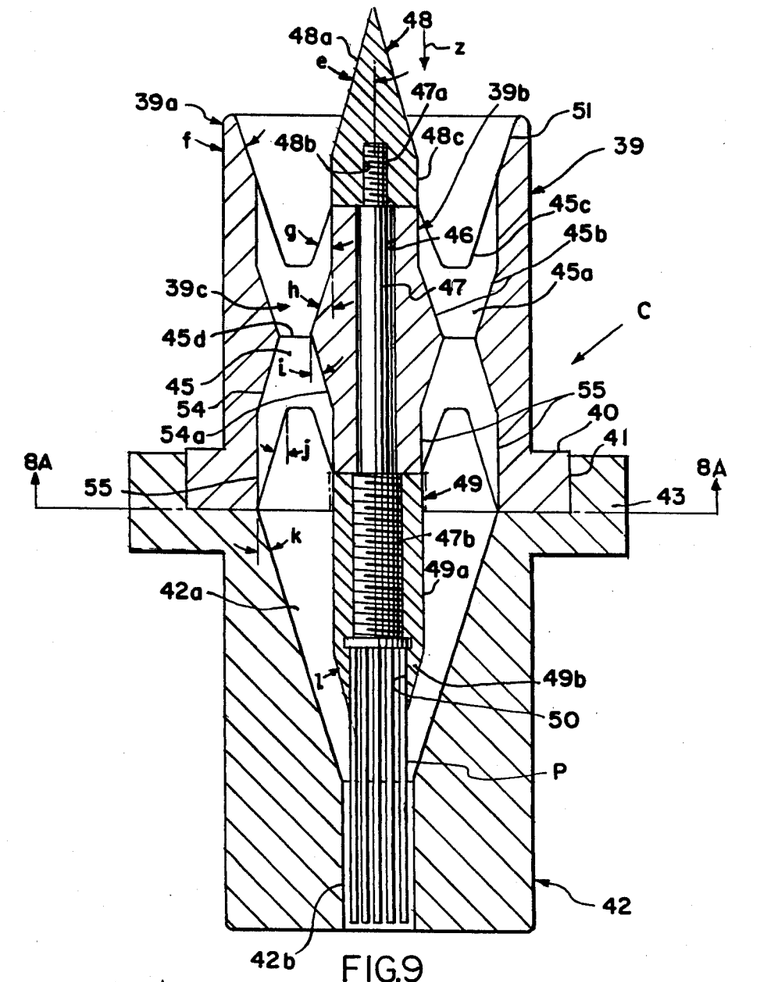
FIG. 9 is a sectional, elevational view taken on the line 9—9 of FIG. 8.
Figure 10:
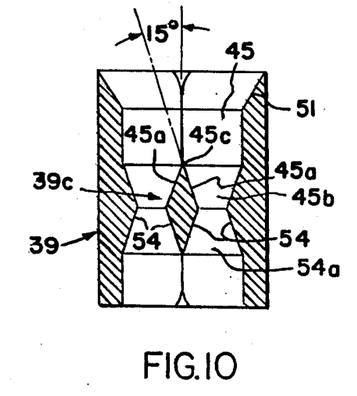
FIG. 10 is a fragmentary, sectional, elevational view taken on the line 10—10 of FIG. 8.

At the lower end of each manifold assembly M in FIGS. 5 and 6, is a die mounting plate 38 which receives the die components generally designated C which comprise an integral part of the present invention. While the system described accommodates four sets of such die components C, which are more particularly illustrated in FIGS. 8-10, a fewer or greater number of die component sets C may be involved. FIGS. 8-10 particularly illustrate how each of the die components sets is fabricated in a manner to facilitate its ready disassembly. Thus, each system C includes an upper receiving member, generally designated 39, having a lower flange 40 (FIG. 9) received in a recessed opening 41 provided in a lower discharge member, generally designated 42, having a shouldered flange 43. The counterbores 44 (FIG. 6), provided in member 38 receive the members 42 in the manner indicated, with each member 39 received in the passage 37 provided for it, as illustrated.

Each of the members 39 comprises an outer ring, generally designated 39a, separated from a core, generally designated 39b, by radial ribs, generally designated 39c, which define a plurality of spaced apart elongate, segmental passages 45 surrounding core 39b. The configuration of passages 45, through which the mass is passed to a divergent frusto-conical passage 42a in the member 42, which communicates with the cylindrical discharge passage 42b in the lower end of member 42, will be presently described.

Each core 39b is centrally bored as at 46 to receive a pin 47, the reduced threaded upper end of which, 47a, receives a flow dividing member, generally designated 48, having a threaded bore 48b. Each member 48 is formed with a conical portion 48a extending up into the manifold passage 36 and terminating in a cylindrical portion 48c. Tapered portion 48a extends at an angle e from the axis of core 39b and the direction of flow z. At its lower end, pin 47 is threaded as at 47b to receive an internally threaded sleeve member 49 which extends into the divergent passage 42a and includes a cylindrical portion 49a and a conical portion 49b. A series of bored openings 50 provided in the portion 49b fixedly mount the elongate pins P, which extend from the passage 42a to the exit end of the passage 42b and form the longitudinal perforations in the product expressed as a cylinder from the passage 42b.

It will be noted that the upper inner wall of the outer portion 39a of member 39 is inclined at an angle f to the direction of flow, as at 51, and that each of the marginal walls of openings 45 is made up of radial and circumferential, downwardly and inwardly sloped surfaces 45a and 45b respectively sloping at the same angle in a downward direction. The adjacent radial surfaces 45a of each rib 39c slope from a radial ridge-line 45c to the ends of adjacent reduced metering necks 45d in the passages 45 intermediate the ends of flow passages 45. Convergent downwardly and inwardly sloped surfaces 45b slope to form the opposite sides of each neck 45d, which, in plan, is generally oblong in configuration. The lower portions of passageways 45 are similarly configured in an axial direction, except vertically reversed. They are formed by diverging radial and circumferential walls 54 and 54a, respectively, and circumferentially inner and outer vertical walls 55. Passages 45 are thus generally hour-glass shaped in vertical cross-section as shown in FIG. 9.

It is to be emphasized that each of the angles e, f, g, h, i, j, k, and l are 15° or less so that no abrupt turns or corners are presented within which secondary flows can occur, and in which dead spots of material can accumulate. The passages 45 between ribs 39c are of the configuration disclosed and converge in this configuration down to each reduced orifice 45d. They then diverge outwardly in the same configuration to empty into convergent passageway 42a. The ribs 39c are shown in cross-section in FIG. 10 and, as shown have convergent upper, lower, and side surfaces. There is a pressure drop in the discharge passage 42b of each of the die components C which is far greater than the pressure drop anywhere else in the system. The pressure drop in passage 42b is the only pressure drop which is significant in the present design wherein the pressure drop is less than in the prior art devices by about 50%.

THE OPERATION

Because the various delivery and distributing passages are provided in a pair of identical mating die halves 26, the manufacture of the manifold assembly M flow passages is greatly facilitated. The network of mating heat transfer passages can also readily be provided in the separate halves 26 to accommodate a recirculating heat transfer fluid which cools the unit and prevents heat buildup therein. The potentially explosive viscous mass which is continuously delivered to the opening IO feeds smoothly through the passages in the manifold without any abrupt changes in direction greater than 15°. Similarly, when the flow is divided in the passages 36 by the conically shaped portions 48a of the sets of die components C, there is no substantial pressure drop as the material is guided by the inlet portions of passages 45 to the metering necks 45d and then further is guided to the frusto-conical passage 42a by the discharge portions of the hour-glass-shaped passages 45. Pins P, which are secured at their inner ends by soldering, or otherwise, can be readily interchanged to provide the desired number of longitudinal passages of the desired configuration in the product extruded from the passage 42b by substituting various sleeves 49. As the solidifying product exits from discharge passage 42b, it is severed by a suitable cutter member into lengths comprising cylindrical pellets having axially parallel passages which are open at both ends.

While one embodiment of the invention has been described in detail, it will be apparent to those skilled in the art that the disclosed embodiment may be modified. Therefore, the foregoing description in all aspects is to be considered exemplary rather than limiting in any way, and the true scope of the invention is that defined in the following claims.

What is claimed is:

1. In a system for receiving plastic material extrudate from a mixer or other source of flow under pressure and discharging the material in a plurality of cylindrical configurations, each having a plurality of axially extending perforations:
   a. die channel means including a plurality of separate branch lines;
   b. a plurality of downstream dies, each communicating with one of said branch lines;
   c. each die comprising a surrounding cylindrical body sleeve providing an axially extending passage means with an axially concentric entrance channel and reduced diameter discharge channel;
   d. an axially extending core portion having generally radially directed ribs connecting it with the sleeve, said ribs separating said passage means into a group of circumferentially spaced, axially convergent die passages extending axially between the sleeve and core between said ribs to pass material to said discharge channel, there being radial surfaces on circumferentially adjacent ribs connecting the core portion with the body which axially converge, and said radial surfaces being joined to axially convergent, radially opposite, circumferential surfaces on the sleeve and core leading to and, with said radial surfaces, defining reduced metering openings for said die passages of generally frusto-conical, transverse configuration;
   e. The core portion in each die further having a conically projecting portion at its axially upstream and downstream ends, upstream and downstream respectively of said ribs;
   f. A plurality of axially extending elongate pins extending from said core portion into said discharge channel to form said perforations as said material exits the discharge channel; and
   g. said sleeve surfaces, said rib surfaces and said conically projecting portions all extending at relatively shallow, acute angles with respect to the axis of said sleeve for distributing the flow uniformly to and from said passages while avoiding "dead spot" formation.

2. The system defined in claim 1 in which said angles are in the neighborhood of fifteen degrees or less.

3. The invention defined in claim 1 wherein said pins protrude axially from said conically projecting core portion at said downstream end of the core portion.

4. The invention defined in claim 1 in which each discharge channel includes a convergent portion, surrounding the downstream conical portion of said core portion and said pins at said downstream end, and a terminal cylindrical portion into which said pins extend.

5. The invention defined in claim 1 in which said die channel means includes a unitary supply channel changing from circular to figure-eight section gradually, with the portion of figure-eight section diverging gradually to form a pair of curvilinearly divergent branch lines.

6. The invention defined in claim 5 in which the downstream ends of said branch lines terminate in a frusto-conically divergent portion, and the axially upstream conical portion of each core projects in an upstream direction into said frusto-conically divergent portion.

7. The invention defined in claim 5 in which each branch line formed changes gradually to figure-eight section in configuration and then diverges to a pair of further branch lines.

8. The invention defined in claim 5 wherein each of the branch lines is circular in cross-section perpendicular to its axis of extent.

9. The invention defined in claim 10 in which the wall portion of each branch line laterally adjacent the other branch line is formed by a generally oval-shaped central core portion of the die having a side curvature substantially no less than eight times the radius of the branch lines.

10. In a die system for receiving plastic material extrudate from a mixer or other source of flow under pressure and discharging the material in a cylindrical configuration, having a plurality of axially extending perforations:
   a. a surrounding cylindrical body sleeve providing an axially extending passage means with an axially concentric entrance channel and discharge channel;
   b. an axially extending core portion having generally radially directed ribs connecting it with the sleeve, said ribs separating said passage means into a group of circumferentially spaced die passages with axially convergent marginal walls extending axially between the sleeve and core between said ribs to pass material to said discharge channel, said convergent walls comprising radial surfaces on circumferentially adjacent ribs connecting the core portion with the sleeve which axially converge, there being also axially convergent, radially opposite, circumferential surfaces on the sleeve and core leading to and, with said radial rib surfaces, defining reduced metering openings for said die passages of generally frusto-conical transverse configuration;
   c. a plurality of axially extending elongate pins extending from said core portion into said discharge channel to form said perforations as said material exits the discharge channel; and
   d. said sleeve surfaces and said rib surfaces all extending at relatively shallow acute angles relative to the sleeve axis.

11. The invention defined in claim 10 wherein said die passages are of generally hour-glass configuration axially.

12. The invention defined in claim 10 wherein said core portion has a conically projecting portion at its downstream end and said surrounding body sleeve has a portion with a convergent bore of the same inclination forming a portion of said discharge channel into which the downstream conical portion projects; said pins being mounted to project from said downstream conical portion in axial parallelism.

13. The system defined in claim 10 in which said angles are in the neighborhood of fifteen degrees or less.

14. In a system for receiving plastic material extrudate from a mixer or other source of flow under pressure and discharging the material in a plurality of cylindrical configurations, each having a plurality of axially extending perforations:
   a. die channel means including a plurality of separate branch lines;
   b. a plurality of downstream dies, each communicating with one of said branch lines;
   c. each die comprising a surrounding cylindrical body sleeve providing an axially extending passage means with an axially concentric entrance channel and reduced diameter discharge channel;
   d. an axially extending core portion having generally radially directed ribs connecting the core portion with the sleeve, said ribs separating said passage means into a group of circumferentially spaced upstream die passage portions with axially convergent marginal walls extending axially between the sleeve and core between said ribs to pass material to said discharge channel, said convergent walls comprising axially convergent radial surfaces on circumferentially adjacent ribs connecting the core portion with the sleeve which axially converge, there being also convergent, radially opposite, circumferential surfaces on the sleeve and core leading to and, with said radial rib surfaces, defining reduced metering openings for said die passage portions of generally frusto-conical transverse configuration;
   e. said ribs also separating said passage means into a group of circumferentially spaced downstream die passage portions extending downstream from said metering openings toward said discharge channel and having divergent marginal walls extending axially between the sleeve and core between said ribs, said divergent walls comprising axially divergent radial surfaces on circumferentially adjacent ribs connecting the core portion with the body which axially diverge, there also being axially divergent, radially opposite, circumferential surfaces on the sleeve and core;
   f. The core portion in each die further having a conically projecting portion at its axially upstream and downstream ends, upstream and downstream respectively of said ribs;
   g. a plurality of axially extending elongate pins extending from said core portion into said discharge channel to form said perforations as said material exits the discharge channel; and
   h. said sleeve surfaces, said rib surfaces and said conically projecting portions all extending at relatively shallow acute angles relative to the sleeve axis.

15. In a die system for receiving plastic material extrudate from a mixer or other source of flow under pressure and discharging the material in a cylindrical configuration, having a plurality of axially extending perforations:
   a. a surrounding cylindrical body sleeve providing an axially extending passage means with an axially concentric entrance channel and reduced diameter discharge channel;
   b. an axially extending core portion having generally radially directed ribs connecting the core portion with the sleeve, said ribs separating said passage means into a group of circumferentially spaced die passage portions with axially convergent marginal walls extending axially between the sleeve and core between said ribs to pass material to said discharge channel, said convergent walls comprising radial surfaces on circumferentially adjacent ribs connecting the core portion with the sleeve which axially converge, there being also axially convergent, radially opposite, circumferential surfaces on the sleeve and core leading to and, with said radial rib surfaces, defining reduced metering openings for said die passage portions of generally frusto-conical transverse configuration;
   c. said ribs also separating said passage means into a group of circumferentially spaced downstream die passage portions extending downstream from said metering openings toward said discharge channel and having divergent marginal walls extending axially between the sleeve and core between said ribs, said divergent walls comprising axially divergent radial surfaces on circumferentially adjacent ribs connecting the core portion with the body which axially diverge, there also being axially divergent, radially opposite, circumferential surfaces on the sleeve and core;
   d. a plurality of axially extending elongate pins extending from said core portion into said discharge channel to form said perforations as said material exits the discharge channel; and
   e. said sleeve surfaces and said rib surfaces all extending at relatively shallow acute angles with respect to the axis of said sleeve.

16. The system defined in claim 15 in which said angles are in the neighborhood of fifteen degrees or less.

17. In a system for receiving plastic material extrudate from a continuous mixer or other source of flow under pressure and releasing it in the form of multiple strands having a plurality of axially parallel perforations:
   a. die channel block means having an axially convergent inlet of circular cross-section for receiving the extrudate merging concentrically to a passage of figure-eight section, having opposed saddle portions which gradually neck in axially, and which diverges curvilinearly at a shallowly acute angle relative to the axis of said passage into a pair of separate curvilinear branch lines of circular cross-section perpendicular to their axis of extent, said branch lines then curving gradually to terminate in portions generally axially parallel to said inlet and passage;
   b. a plurality of downstream dies, each communicating with one of said branch lines;
   c. each die comprising a surrounding body sleeve defining passage means having an entrance opening and a discharge channel, and including an axial core portion;
   d. generally radially directed ribs, having axially inclined radial surfaces on adjacent ribs connecting the core portion with the body, defining a plurality of gradually narrowing, axially extending passages through which material flows from the entrance opening to the discharge channel; and
   e. a plurality of axially extending elongate pins extending from said core portion into said discharge channel to form said perforations as said material exits the discharge channel.

18. The invention defined in claim 17 wherein said die passages are axially of generally hour-glass configuration.

19. The invention defined in claim 17 wherein said branch lines each curve radially as they diverge, and then recurve back on a radius no less than eight times the radius of the branch lines.

20. The invention defined in claim 17 wherein said die channel block means consists of two mating halves with the inlet, passage, and branch lines half in each one; said saddle portions being in each of said halves.

21. The invention as defined in any one of claims 1, 10, 14, 15, or 17 wherein said plastic material extrudate is an explosive.

* * * * *

UNITED STATES PATENT AND TRADEMARK OFFICE
CERTIFICATE OF CORRECTION

PATENT NO. : 4,945,807

DATED : August 7, 1990

INVENTOR(S) : Bernard A. Loomans; James E. Kowalczyk; Jerry W. Jones

It is certified that error appears in the above-identified patent and that said Letters Patent is hereby corrected as shown below:

Column 8, line 17, change "10" to -- 8 --.

Signed and Sealed this

Eighteenth Day of October, 1994

Attest:

BRUCE LEHMAN

Attesting Officer

Commissioner of Patents and Trademarks